(12) United States Patent
Kreitmeier

(10) Patent No.: US 7,478,524 B2
(45) Date of Patent: Jan. 20, 2009

(54) COAL FIRED POWER GENERATION PLANT

(75) Inventor: Franz Kreitmeier, Baden (CH)

(73) Assignee: ALSTOM Technology Ltd., Baden (CH)

( * ) Notice: Subject to any disclaimer, the term of this patent is extended or adjusted under 35 U.S.C. 154(b) by 83 days.

(21) Appl. No.: 11/467,601

(22) Filed: Aug. 28, 2006

(65) Prior Publication Data

US 2007/0012025 A1    Jan. 18, 2007

Related U.S. Application Data

(63) Continuation of application No. PCT/EP2005/050690, filed on Feb. 16, 2005.

(30) Foreign Application Priority Data

Mar. 1, 2004    (EP)    .................................. 04100815

(51) Int. Cl.
    *F02C 6/00*    (2006.01)
(52) U.S. Cl. .................... 60/39.182; 122/7 R
(58) Field of Classification Search .............. 60/39.182, 60/784; 122/7 R, 7 B
    See application file for complete search history.

(56) References Cited

U.S. PATENT DOCUMENTS

| | | | | |
|---|---|---|---|---|
| 4,831,817 | A | * 5/1989 | Linhardt | ................... 60/39.182 |
| 5,251,432 | A | * 10/1993 | Bruckner et al. | ......... 60/39.182 |
| 5,315,816 | A | 5/1994 | Kemmer et al. | |
| 5,642,614 | A | * 7/1997 | Bozzuto et al. | .......... 60/39.182 |

FOREIGN PATENT DOCUMENTS

| | | |
|---|---|---|
| EP | 1004751 | 5/2000 |
| JP | 04339138 | 11/1992 |
| WO | WO02/084080 | 10/2002 |
| WO | WO2005/083238 | 9/2005 |

OTHER PUBLICATIONS

Hnida, V. U., "Dampfturbinen auf Rekordkurs," Energie, 1995, pp. 54-55, vol. 47, No. 1-2 (published unknown).
Luz, V. M. et al., "Betriebsverhalten unterschiedlicher Gasturbinenschaltungen mit Druckwirbelschichtfeuerung," MTZ Motortechnische Zeitschrift, 1992, pp. 268-274, vol. 53, No. 6, Franckh'sche Verlagshandlung, Abteilung Technik, Stuttgart, Germany.
Omata, K., et al. "Karita 360 MW PFBC an imminent prospect," Modern Power Systems, 1997, pp. 33-38, vol. 17, No. 4, Modern Power Systems, Kent, United Kingdom.
Search Report for EP App. No. 04100815 (Aug. 16, 2004).
International Search Report for PCT App. No. PCT/EP2005/050690 (Jul. 25, 2005).

* cited by examiner

*Primary Examiner*—Louis J Casaregola
(74) *Attorney, Agent, or Firm*—Adam J. Cermak; Cermak Kenealy & Vaidya LLP

(57)    ABSTRACT

A power generation plant includes a conventional steam turbo train, a high temperature turbo train, and a coal fired boiler (1) with a fluidized bed combustor. The high temperature turbo train is particularly arranged vertically and in parallel with the coal fired boiler (1) and separately from the conventional turbo train. Transfer flow lines (4, 5, 6) are run from the boiler (1) to the high temperature turbines over minimal lengths. The arrangement of the two turbo trains separately from one another and the vertical arrangement of the high temperature turbo train are advantageous in terms of plant efficiency and fabrication and maintenance thereof.

26 Claims, 4 Drawing Sheets

COAL FIRED POWER GENERATION PLANT

This application is a Continuation of, and claims priority under 35 U.S.C. § 120 to, International application number PCT/EP2005/050690, filed 16 Feb. 2005, and under 35 U.S.C. § 119/365 to European application number 04100815.2, filed 1 Mar. 2004, the entireties of both of which are incorporated by reference herein

BACKGROUND OF THE INVENTION

1. Field of the Invention

The invention relates to a coal fired power generation plant operating on the basis of a high temperature steam process.

2. Brief Description of the Related Art

The generation of electrical energy by means of coal fired power generation plants is being constantly improved in terms of environmental friendliness of coal combustion and an increase in the efficiencies of the plants. In the report "Dampfturbinen auf Rekordkurs" (Steam turbines set for a record) in the journal Energie, Edition 47, No. 1-2, January/February 1995, there is a description of coal fired power generation plants with high temperature steam turbines that are achieving increased efficiencies. The turbines can be operated at fresh steam temperatures of up to 580° C. and at fresh steam pressures of up to 270 bar through the use of new high temperature resistant materials such as ten percent chrome steel. The high temperature steam process mentioned is also suitable for the application of carburation and the combination of gas and steam power generation plants using pressurized fluidized bed combustion.

WO 02/084080 describes a steam power generation plant with increased efficiency having a retrofitted high temperature turbo train arranged on a separate rotor, in which the separate rotor is either coupled to the existing rotor or uncoupled from it. Components of steel or nickel-based materials are used for the high temperature turbo train, allowing the turbo train to be operated with fresh steam of up to 720° C. and up to 375 bar. The increased fresh steam temperature in the boiler is achieved, for example, by modifying the superheater or connecting in series a further superheater.

In "Modern Power Systems", April 1997, p. 33 et sqq., a description is given of a coal fired power generation plant which has a boiler with pressurized fluidized bed combustion ("PFBC"). This boiler supplies fresh steam for a high pressure steam turbine and reheated steam for an intermediate pressure steam turbine, as well as high pressure exhaust gas for a gas turbine.

SUMMARY OF THE INVENTION

An aspect of the present invention includes a coal fired power generation plant with high temperature steam turbines which is not expensive to manufacture and which has good transient behavior of the boiler, the steam turbine and the transfer flow lines between the boiler and turbine.

Another aspect of the present invention includes a first power generation plant having at least one high temperature turbo train and at least one conventional steam turbo train, together with a coal fired boiler and a condensation and feedwater heating facility. The high temperature turbo train advantageously includes a first generator and is arranged on a first rotor, with the train arranged vertically and parallel with the boiler, and the conventional steam turbo train, including a second generator and arranged on a second rotor, is arranged separately from the high temperature turbo train.

The conventional steam turbo train includes steam turbines whose components are manufactured exclusively from steel and which are operated at steam temperatures typically of up to 560° C., possibly up to 600 or 620° C.

This first power generation plant may be constructed as a new plant.

A second power generation plant may be constructed as a plant with a retrofit which is installed in an existing power generation plant.

The second power generation plant has a steam generator, a conventional turbo train with a high, intermediate, and low pressure steam turbine, a condensation and feedwater heating facility and, in particular, a retrofit. The retrofit has a coal fired boiler and a high temperature turbo train which is arranged vertically and parallel with the coal fired pressurized boiler and separately from the conventional turbo train.

In a first preferred embodiment of the first and second power generation plant, the high temperature turbo train has a high temperature, high pressure steam turbine, a high temperature intermediate pressure steam turbine, and a high pressure gas turbine which drive a high pressure compressor and a generator. Both high temperature steam turbines are operated with fresh steam from the coal fired boiler, where transfer flow lines of minimal length lead from the boiler to these turbines. The fresh steam for the high temperature high pressure turbine has a temperature within a range of up to 800° and a pressure within a range of up to 425 bar, and the steam for the high temperature intermediate pressure turbine has a temperature within a range of up to 820° C. and a pressure within a range of up to 70 bar. The outlet of the high temperature, high pressure steam turbine is connected by a steam transfer flow line to the inlet of the conventional high pressure turbine, and the outlet of the high temperature, intermediate pressure steam turbine is connected by a further steam transfer flow line to the inlet of the conventional intermediate pressure turbine.

The high pressure gas turbine is operated with exhaust gas from the coal fired boiler. For this purpose a transfer flow line of minimal length leads from the boiler to the high pressure gas turbine. The exhaust gas has a temperature of 850° C. and a pressure of 13 bar, for example.

In a further preferred embodiment of the first and second power generation plants, the outlet of the high temperature, intermediate pressure steam turbine and the outlet of the high temperature, high pressure steam turbine are connected by transfer flow lines to the inlet of the conventional high pressure steam turbine and the inlet of the conventional intermediate pressure steam turbine, respectively.

In a further preferred embodiment of the first and second power generation plants, in an extension of the first embodiment of the high pressure gas turbine, a combustion chamber is connected ahead of the turbine, to which chamber lead, on the one hand, a line for exhaust gas from the coal fired boiler and, on the other hand, a line for syngas from a carburator. This enables the high pressure gas turbine to be operated with hot gas having a temperature within a range of up to 1200° C. and a pressure of up to 30 bar, which results in higher thermal efficiency.

The carburator is designed exclusively for the combustion chamber, and in particular for producing syngas. The advantage of the so-called partial carburation thereby achieved is that the power generation plant efficiency is higher than that of a power generation plant with integrated carburation.

In all the embodiments of the first and second power generation plants, the boiler which supplies the working medium for the high temperature turbo train preferably is a pressurized boiler having a stationary fluidized bed combustor or so-called "pressurized fluidized bed combustor". The advantage of this boiler is that it requires smaller heat transfer areas because of the working pressure, which results in a significant reduction in apparatus size and also in fabrication costs.

In one variant the boiler is a pressurized boiler with a pressurized circulating fluidized bed combustor.

In a further variant an atmospheric boiler is used. Since in principle this requires a far larger heat exchange area in the boiler, this is feasible if there is good heat transfer to the heating surfaces.

In particularly advantageous embodiments of the invention, a line leads from the high pressure gas turbine to a low pressure gas turbine which is arranged on a separate rotor and drives a low pressure compressor. In particular, the low pressure gas turbine can be regulated by means of an adjustable guide row, thus enabling the speed of this turbo train, and hence also the mass flow, to be varied.

In advantageous embodiments of the invention, a selective catalytic reducer and a plurality of feedwater heaters heated with exhaust gas are connected in series to the low pressure gas turbine for utilizing the energy contained in the exhaust gases of the gas turbines. For this purpose they are connected on the water side to the feedwater heating facility of the power generation plant.

The vertical arrangement of the high temperature turbo train is advantageous in terms of efficiency of the power generation plant and fabrication and maintenance of the turbines and transfer flow lines. It enables the high temperature turbines to be constructed in a well design, which avoids constructing the housing in two halves with flanged connections. In a vertical design the turbines are also relatively maintenance friendly since they can be opened easily.

The high temperature steam turbines have smaller dimensions than the conventional steam turbines operated with fresh steam of up to 560° C. The arrangement of the high temperature steam turbines near the boiler on a separate rotor, separate from the conventional steam turbines, enables the high temperature turbines to be constructed in a compact design. For example, a relatively small rotor diameter and a more advantageous ratio of rotor diameter to blade length are possible, which may result in increased efficiency due to better flow conditions. The vertical arrangement of the rotor has the added advantage that the shaft dynamics can be controlled more easily.

In particular, the vertical arrangement of the high temperature steam turbines parallel with the boiler enables the transfer flow lines to be run from the boiler to the turbines over relatively short lengths compared to the transfer flow lines which would be required were the turbines to be arranged horizontally. Since the transfer flow lines have to be manufactured from expensive Ni-based materials or other high temperature resistant material, significant fabrication cost savings are achieved here.

The transient behavior of the boiler, the high temperature steam turbines, and the transfer flow lines is favored by this plant arrangement. The high pressure in the boiler means that its components can have smaller dimensions and results in improved transient behavior of the components. For example, the boiler can be brought more quickly to full load and generally reacts faster to operational variations.

DETAILED DESCRIPTION OF EXEMPLARY EMBODIMENTS

Figure 1:
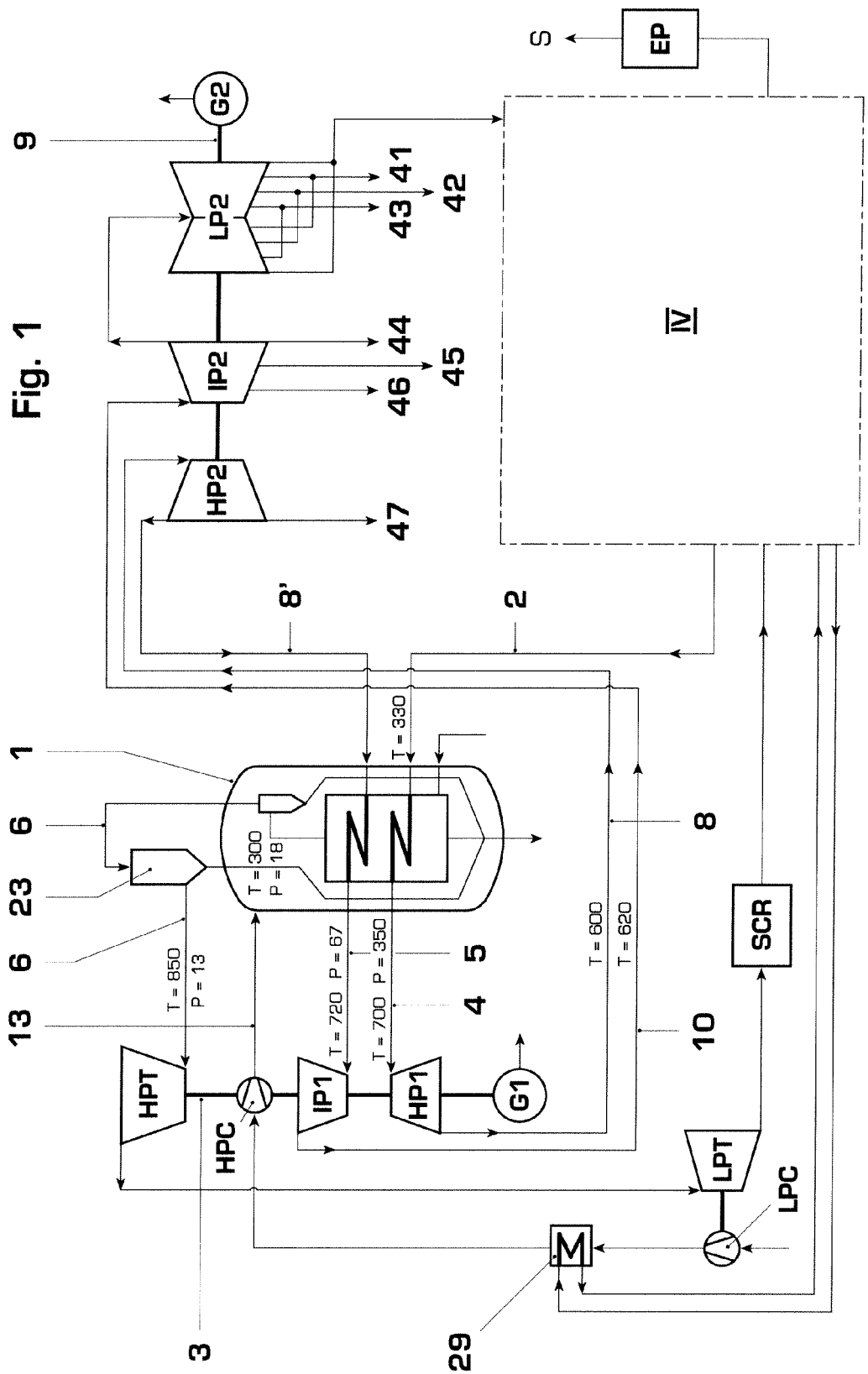
FIG. 1 shows a first exemplary coal fired power generation plant, constructed as a new plant.

FIG. 1 shows a first coal fired power generation plant with a high temperature turbo train, which power generation plant can be constructed as a whole new plant. It has a coal fired pressurized boiler 1, preferably with a fluidized bed combustor, to which lead a feedwater line 2 and a steam line 8'. Boiler 1 includes, among other things, an evaporator and a superheater for heating steam at high pressure. Transfer flow lines 4 and 5 lead from boiler 1 to a high temperature high pressure steam turbine HP1 and a high temperature intermediate pressure steam turbine IP1. A further transfer flow line 6 feeds exhaust gas from boiler 1 to a high pressure gas turbine HPT. The three turbines HPT, HP1 and IP1, together with a high pressure compressor HPC and a generator G1, on rotor 3, form a turbo train which is arranged vertically and parallel with boiler 1.

The high temperature steam turbines and high pressure gas turbine HPT are designed for operation at high temperatures and high pressures since their components are manufactured from nickel-based materials. Transfer flow lines 4, 5 and 6 are also manufactured from nickel-based materials.

These lines 4, 5 and 6 are run over a minimal length thanks to the vertical arrangement of the turbines parallel with the boiler. Their minimal length provides a significant cost saving in view of the high costs of the nickel-based materials.

Feedwater is fed via line 2, with an inlet temperature of 330° C., for example, into boiler 1, and is there heated in the evaporator and superheater to a temperature of 700° C., for example, at a pressure of 350 bar. When nickel-based materials are used in the high temperature components of the turbo train, steam temperatures of up to 820° C. and pressures of up to 425 bar may also be achieved.

From the boiler the superheated steam is fed via first transfer flow line 4 to high temperature high pressure steam turbine HP1, in which the steam is expanded. The expanded steam, which still has a temperature of 600° C., for example, is then fed via a line 8 to a conventional high pressure steam turbine HP2. Together with a conventional intermediate pressure steam turbine IP2, a conventional low pressure steam turbine LP2 and a second generator G2, this forms a conventional turbo train arranged on a second rotor 9.

The steam expanded in conventional high pressure steam turbine HP2 is returned via a line 8' to boiler 1, where it is again heated in a reheater to 720° C., for example, at a pressure of approx. 67 bar. This reheated steam is fed via a short line 5 into high temperature intermediate pressure steam turbine IP1. The steam expanded in IP1 is fed via a line 10 to conventional intermediate pressure steam turbine IP2 and there further expanded and fully expanded in the series connected low pressure steam turbine LP2. Finally the steam is fed to a condensation and feedwater heating facility shown in FIG. 4.

Line 6 feeds exhaust gas having a temperature of 850° C., for example, from boiler 1 via a high temperature filter 23 to high pressure gas turbine HPT, in which it is expanded. The expanded gas is then fed to a series connected controllable low pressure gas turbine LPT arranged on a separate rotor. The gas fully expanded there is fed to a selective catalytic reducer SCR in order to reduce the nitrogen oxides, then to a series of exhaust gas heated feedwater heaters 12, shown in FIG. 4. The feedwater heaters are connected to the feedwater heating facility on the water side. An electro filter EP and a stack S are series connected to feedwater heaters 12.

Figure 4:
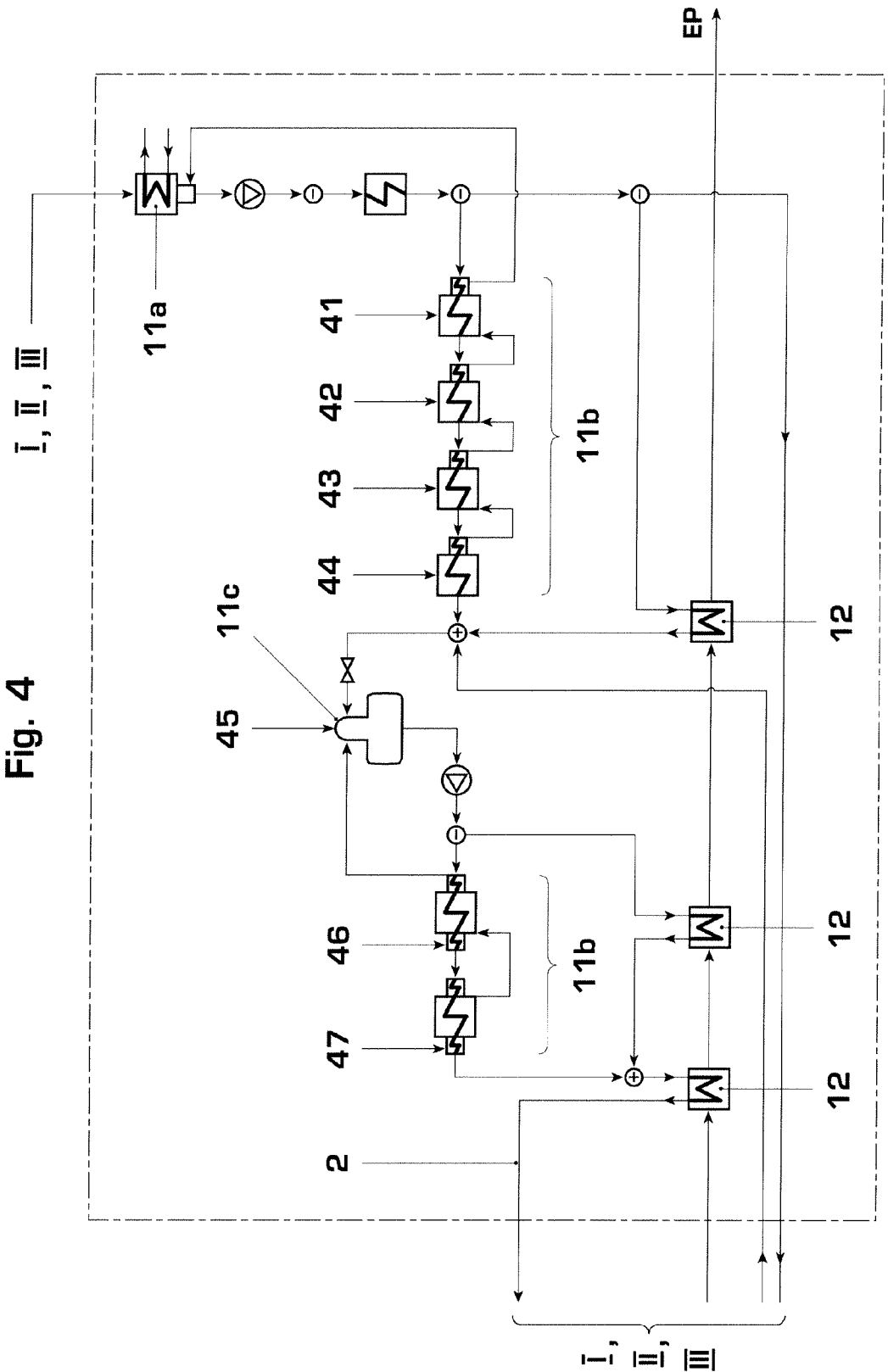
FIG. 4 shows plant section IV of the power generation plants shown in FIGS. 1, 2, and 3.

FIG. 4 shows a conventional condensation facility and a conventional feedwater heating facility. It includes a condensor 11a, a feedwater tank 11c and feedwater heater 11b, which are heated with extraction steam from the conventional turbines via lines 41-47, together with feedwater heaters 12 heated with exhaust gas, which are series connected to the gas turbines. The feedwater heating facility is connected by line 2 to boiler 1, thereby closing the water-steam circuit.

FIG. 1 shows a low pressure compressor LPC and a high pressure compressor HPC, which are driven by low pressure gas turbine LPT and high temperature turbines HPT, HP1 and IP1 respectively. Together with low pressure turbine LPT the low pressure compressor forms a further separate turbo train. A heat exchanger 29 is connected between the two compressors to cool the air to be compressed. A line 13 for the compressed air leads from the high pressure compressor to boiler 1, and feeds air at 300° C. and 18 bar, for example, into the boiler.

Figure 2:
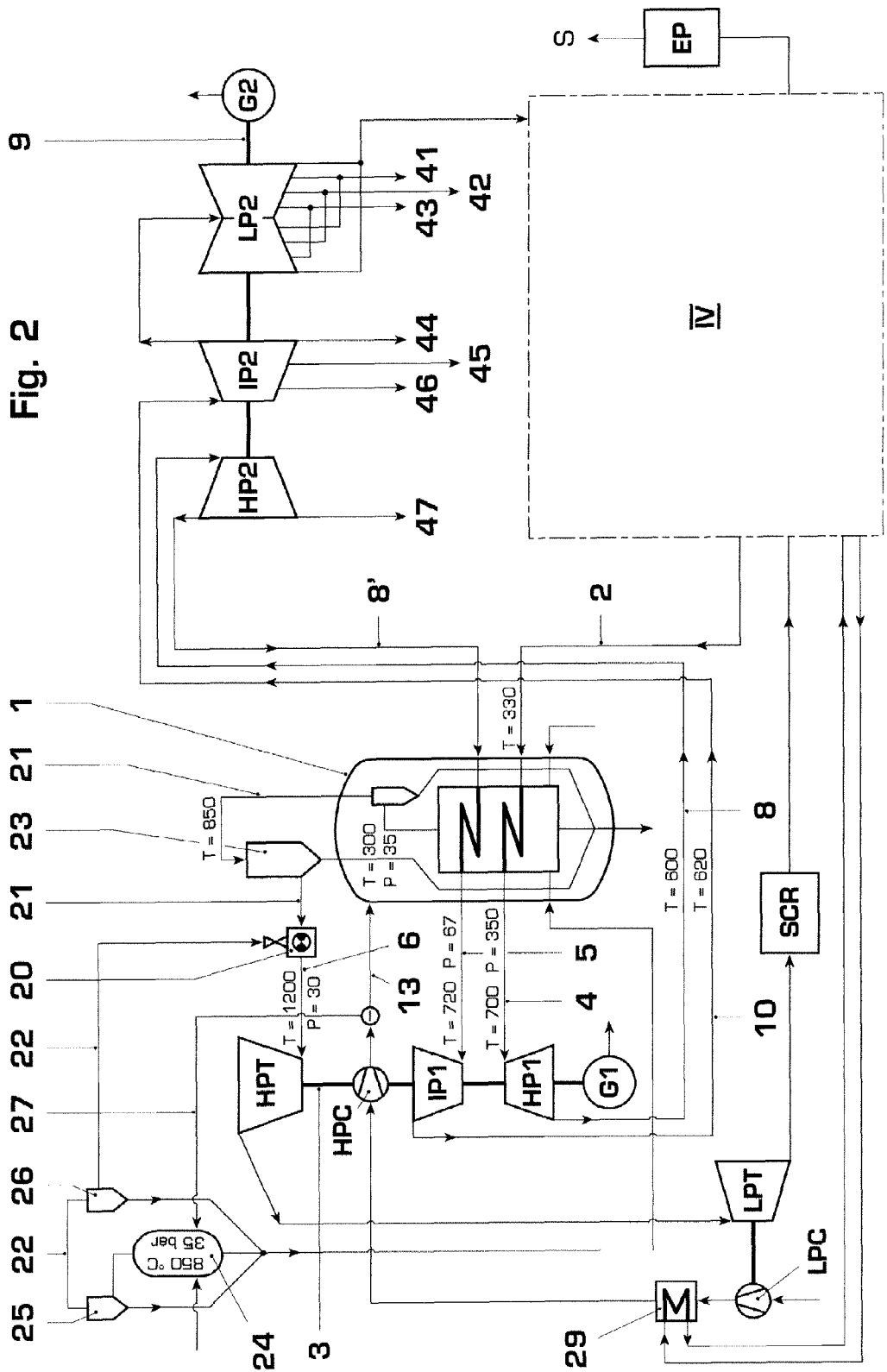
FIG. 2 shows a second coal fired power generation plant, constructed as a new plant.

FIG. 2 shows the first coal fired power generation plant as a new plant. It has all the components which are installed in the plant as illustrated in FIG. 1. In addition it has a combustion chamber 20 which is connected in series directly to high pressure gas turbine HPT. An exhaust gas line 21 and a syngas line 22 lead to combustion chamber 20. First line 21 feeds the exhaust gas from boiler 1 through a high temperature cyclone and a high temperature filter 23 and to combustion chamber 20. There the gas still has a temperature of 850° C. and a pressure of 13 bar, for example, this temperature being determined by the ash melting point. Syngas line 22 feeds syngas from a carburator 24 via a cyclone 25 and a filter 26 to combustion chamber 20. The carburator only produces as much fuel as the combustion chamber requires (partial carburation). A line 27 also leads from high pressure compressor HPC to carburator 24 for supplying the carburator with heated compressed air.

Figure 3:
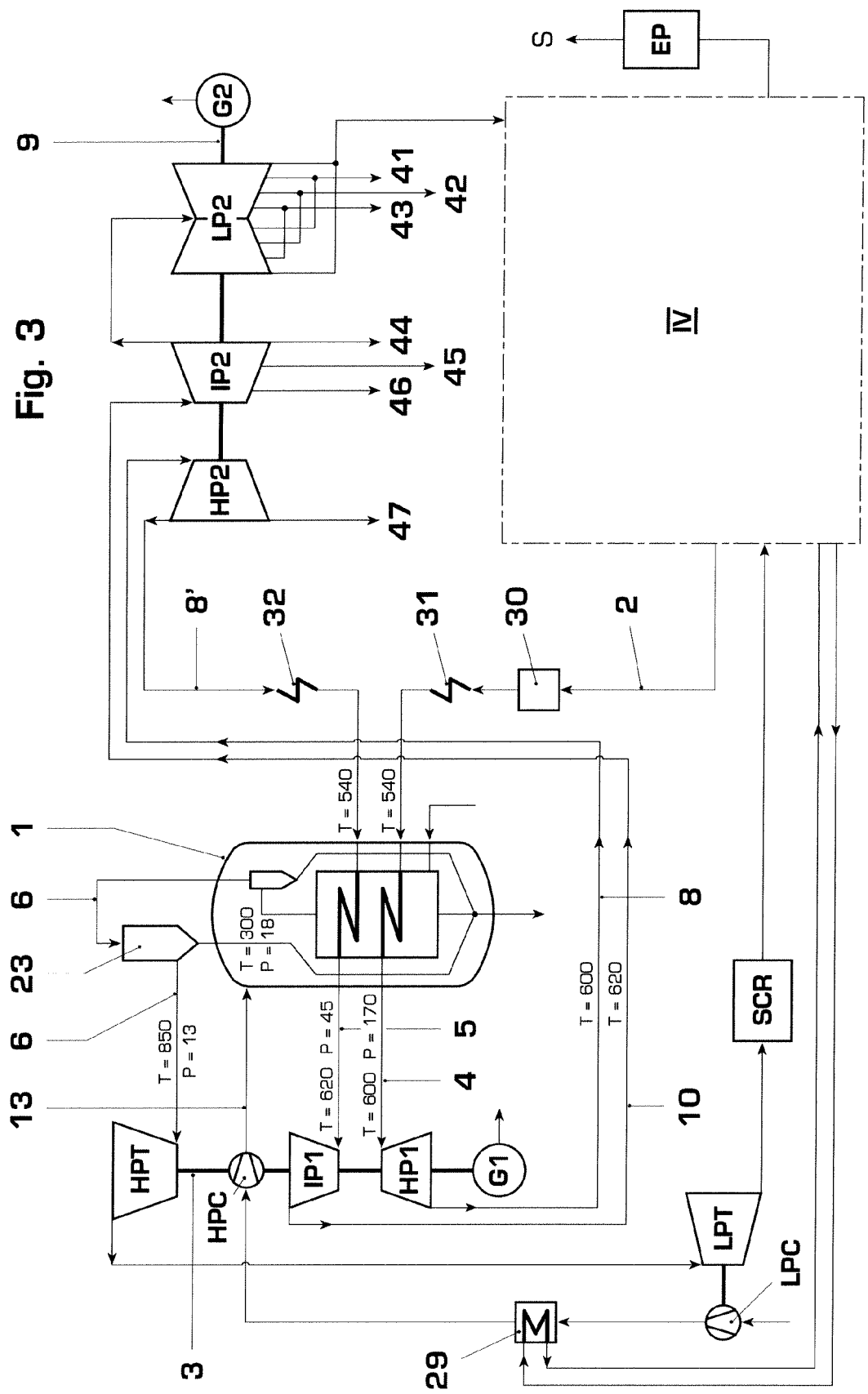
FIG. 3 shows a coal fired power generation plant, constructed as a plant with retrofit.

FIG. 3 shows the second coal fired power generation plant as a plant with retrofit.

The conventional steam turbo train again has a high pressure steam turbine HP2, an intermediate pressure steam turbine IP2, and a low pressure steam turbine LP2, which drive a generator G2 on a rotor 9. The power generation plant has a feedwater heating facility shown in IV. A line 2 leads from the feedwater heating facility to a boiler, for example a coal fired boiler which has an evaporator 30 and a superheater 31. Furthermore, a reheater 32 is installed in line 8' leading from high pressure steam turbine HP2.

The retrofit as illustrated in FIG. 3 preferably has a coal fired pressurized boiler 1, with a stationary fluidized bed combustor or a fluidized circulating bed combustor, with superheater and reheater, which are connected in series to superheater 31 and reheater 32, respectively. The retrofit has high temperature turbines HPT, HP1, and IP1 and high temperature compressor HPC, which are arranged parallel with boiler 1 and vertically on rotor 3, and drive a generator G1. As in the first power generation plant of the invention, as a new plant, short transfer flow lines 4, 5, 6 lead from boiler 1 to the individual turbines for feeding high temperature steam or gas.

Furthermore, the retrofit includes a low pressure compressor LPC, which is driven by a low pressure gas turbine LPT. A selective catalytic reducer SCR and an exhaust gas heated feedwater heater 12, which are connected to devices 11a, 11b and 11c of the feedwater heating facility, are in turn connected in series to low pressure gas turbine LPT. An electro filter EP and stack S are in turn connected in series to feedwater heaters 12.

The retrofit power generation plant is operated as follows, for example. Steam which has been generated in the originally existing boiler with evaporator 30 is fed through superheater 31 and then fed at a temperature of 540° C., for example, into the coal fired boiler with fluidized bed combustor 1, where it is further heated in a second superheater.

The steam heated to 600° C., for example, at an unchanged pressure of 170 bar, is fed via transfer flow line 4 to high temperature high pressure steam turbine HP1, and is expanded there. The expanded steam is then fed via line 8 to conventional high pressure steam turbine HP2. The steam expanded there is fed through a reheater 32 to pressurized boiler 1, where it is fed through a second superheater.

After being superheated to 620° C. at a pressure of 45 bar, the steam is fed through line 5 to high temperature intermediate pressure steam turbine IP1. The steam expanded there is fed via line 10 to conventional intermediate pressure turbine IP2, and is finally fully expanded in conventional low pressure turbine LP2.

Exhaust gases from boiler 1 are fed via line 6 and via a filter into high pressure gas turbine HPT, as in other embodiments of the invention. The gas expanded there is then fed to low pressure gas turbine LPT.

| | List of terms |
|---|---|
| 1 | Pressurized boiler with fluidized bed combustor |
| 2 | Feedwater line |
| 3 | Rotor, vertically arranged, for gas/steam turbo train |
| 4 | Transfer flow line to high pressure high temperature steam turbine HP1 |
| 5 | Transfer flow line to intermediate pressure high temperature steam turbine IP1 |
| 6 | Transfer flow line to high pressure gas turbine HPT |
| 8 | Line to conventional high pressure steam turbine HP2 |
| 8' | Return line to boiler |
| 9 | Rotor, horizontally arranged, for conventional steam turbo train |
| 10 | Transfer flow line to intermediate pressure turbine IP2 |
| 11 | Condensation and feedwater heating facility |
| 11a | Condensor |
| 11b | Feedwater heater heated with extraction steam |
| 11c | Feedwater tank |
| 12 | Feedwater heater heated with exhaust gas |
| 13 | Transfer flow line for combustion air |
| 20 | Combustion chamber |
| 21 | Line for exhaust gas from boiler |
| 22 | Line for syngas |
| 23 | High temperature filter |
| 24 | Carburator |
| 25 | High temperature cyclone |
| 26 | High temperature filter |
| 27 | Line for pressurized air |
| 29 | Heat exchanger |
| 30 | Evaporator |
| 31 | Superheater |
| 32 | Reheater |
| HPT | High temperature high pressure gas turbine |
| LPT | High temperature low pressure gas turbine |
| HP1 | High temperature high pressure steam turbine |
| IP1 | High temperature intermediate pressure steam turbine |
| HP2 | High pressure steam turbine |
| IP2 | Intermediate pressure steam turbine |
| LP2 | Low pressure steam turbine |
| G1, G2 | Generator |
| LPC | Low pressure compressor |
| HPC | High pressure compressor |
| SCR | Selective catalytic reducer |
| EP | Electro filter |
| S | Stack |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A power generation plant comprising:
first and second rotors, the first rotor oriented vertically;
at least one high temperature turbo train on the first rotor;
at least one conventional turbo train on the second rotor;
a coal fired boiler extending vertically along a longitudinal direction;
a condensation and feedwater heating facility;
wherein the high temperature turbo train is arranged vertically and parallel to the coal fired boiler longitudinal direction; and
wherein the conventional turbo train is arranged separately from the high temperature turbo train.

2. A power generation plant according to claim 1 wherein the coal fired boiler and the high temperature turbo train are a retrofit.

3. The power generation plant as claimed in claim 1, wherein the high temperature turbo train comprises a high temperature high pressure steam turbine, a high temperature intermediate pressure steam turbine, and a high pressure gas turbine;
wherein the power generation plant includes a first transfer flow line which leads from the coal fired boiler to the high temperature high pressure steam turbine, and a second transfer flow line which leads from the coal fired boiler to the high temperature intermediate pressure steam turbine; and
wherein the first and second transfer flow lines are configured and arranged to have a minimal length.

4. The power generation plant as claimed in claim 1, further comprising:
a third transfer flow line which leads from the boiler to the high pressure gas turbine for feeding exhaust gas from the boiler, the third transfer flow line having a minimal length.

5. The power generation plant as claimed in claim 1, wherein the coal fired boiler comprises:
a pressurized boiler with a stationary fluidized bed combustor; or
a pressurized boiler with a fluidized circulating bed combustor; or
an atmospheric boiler.

6. The power generation plant as claimed in claim 1, further comprising:
fresh steam for the high temperature high pressure turbine having a temperature within a range of up to 820° C. and a pressure within a range of up to 425 bar; and
steam for the high temperature intermediate pressure turbine having a temperature within a range of up to 820° C. and a pressure within a range of up to 70 bar.

7. The power generation plant as claimed in claim 1, wherein the conventional turbo train comprises:
a high pressure steam turbine, an intermediate pressure steam turbine, a low pressure steam turbine, a first steam transfer flow line leading from the outlet of the high temperature high pressure steam turbine to the inlet of the conventional high pressure turbine, and a second steam transfer flow line leading from the outlet of the high temperature intermediate pressure steam turbine to the inlet of the conventional intermediate pressure turbine.

8. The power generation plant as claimed in claim 1, further comprising:
a combustion chamber connected in series to the high pressure gas turbine.

9. The power generation plant as claimed in claim 8, further comprising:
a first gas flow line for exhaust gas communicating the coal fired boiler with the combustion chamber;
a carburator; and
a second line for feeding syngas communicating the carburator with the combustion chamber.

10. The power generation plant as claimed in claim 9, wherein the carburator is configured and arranged exclusively for supplying the combustion chamber.

11. The power generation plant as claimed in claim 1, further comprising:
a low pressure gas turbine, a separate rotor, and a low pressure compressor, the low pressure gas turbine and the low pressure compressor arranged on the separate rotor; and
a transfer flow line leading from the outlet of the high temperature high pressure gas turbine to the low pressure gas turbine.

12. The power generation plant as claimed in claim 11, wherein the low pressure gas turbine comprises a selective catalytic reducer, and further comprising:
at least one feedwater heater connected in series with the selective catalytic reducer, which at least one feedwater heater is in communication with said gas turbines to be heated by exhaust gas from the gas turbines, the at least one feedwater heater including a water side connected to the condensation and feedwater heating facility.

13. The power generation plant as claimed in claim 1, wherein the high temperature turbo train comprises a high pressure compressor, and further comprising:
a line communicating the high pressure compressor with the boiler for feeding pressurized air.

14. The power generation plant as claimed in claim 13, further comprising:
a line communicating the high pressure compressor with the carburator.

15. The power generation plant as claimed in claim 2, wherein the high temperature turbo train comprises a high temperature high pressure steam turbine, a high temperature intermediate pressure steam turbine, and a high pressure gas turbine;
wherein the power generation plant includes a first transfer flow line which leads from the coil fired boiler to the high temperature high pressure steam turbine, and a second transfer flow line which leads from the coal fired boiler to the high temperature intermediate pressure steam turbine; and wherein the first and second transfer flow lines are configured and arranged to have a minimal length.

16. The power generation plant as claimed in claim 2, further comprising:
a third transfer flow line which leads from the boiler to the high pressure gas turbine for feeding exhaust gas from the boiler, the third transfer flow line having a minimal length.

17. The power generation plant as claimed in claim 2, wherein the coal fired boiler comprises:
a pressurized boiler with a stationary fluidized bed combustor; or
a pressurized boiler with a fluidized circulating bed combustor; or
an atmospheric boiler.

18. The power generation plant as claimed in claim 2, further comprising:
fresh steam for the high temperature high pressure turbine having a temperature within a range of up to 820° C. and a pressure within a range of up to 425 bar; and
steam for the high temperature intermediate pressure turbine having a temperature within a range of up to 820° C. and a pressure within a range of up to 70 bar.

19. The power generation plant as claimed in claim 2, wherein the conventional turbo train comprises:
a high pressure steam turbine, an intermediate pressure steam turbine, a low pressure steam turbine, a first steam transfer flow line leading from the outlet of the high temperature high pressure steam turbine to the inlet of the conventional high pressure turbine, and a second steam transfer flow line leading from the outlet of the high temperature intermediate pressure steam turbine to the inlet of the conventional intermediate pressure turbine.

20. The power generation plant as claimed in claim 2, further comprising:
a combustion chamber connected in series to the high pressure gas turbine.

21. The power generation plant as claimed in claim 20, further comprising:
a first gas flow line for exhaust gas communicating the coal fired boiler with the combustion chamber;
a carburator; and
a second line for feeding syngas communicating the carburator with the combustion chamber.

22. The power generation plant as claimed in claim 21, wherein the carburator is configured and arranged exclusively for supplying the combustion chamber.

23. The power generation plant as claimed in claim 2, further comprising:
a low pressure gas turbine, a separate rotor, and a low pressure compressor, the low pressure gas turbine and the low pressure compressor arranged on the separate rotor; and
a transfer flow line leading from the outlet of the high temperature high pressure gas turbine to the low pressure gas turbine.

24. The power generation plant as claimed in claim 23, wherein the low pressure gas turbine comprises a selective catalytic reducer, and further comprising:
at least one feedwater heater connected in series with the selective catalytic reducer, which at least one feedwater heater is in communication with said gas turbines to be heated by exhaust gas from the gas turbines, the at least one feedwater heater including a water side connected to the condensation and feedwater heating facility.

25. The power generation plant as claimed in claim 2, wherein the high temperature turbo train comprises a high pressure compressor, and further comprising:
a line communicating the high pressure compressor with the boiler for feeding pressurized air.

26. The power generation plant as claimed in claim 25, further comprising:
a line communicating the high pressure compressor with the carburator.

* * * * *